United States Patent [19]

Fukuda et al.

[11] Patent Number: 5,222,229
[45] Date of Patent: Jun. 22, 1993

[54] MULTIPROCESSOR SYSTEM HAVING SYNCHRONIZATION CONTROL MECHANISM

[75] Inventors: Munehiro Fukuda, Sagamihara; Takashi Matsumoto, Tokyo; Takeo Nakada, Kawaguchi, all of Japan

[73] Assignee: International Business Machines, Armonk, N.Y.

[21] Appl. No.: 491,415

[22] Filed: Mar. 9, 1990

[30] Foreign Application Priority Data

Mar. 13, 1989 [JP] Japan ................................. 1-57762

[51] Int. Cl.⁵ ............................................. G06F 13/00
[52] U.S. Cl. ..................................... 395/550; 395/200; 364/DIG. 1; 364/271; 364/271.1; 364/271.2; 364/271.3; 364/270.7
[58] Field of Search ............... 395/550, 425, 325, 800, 395/200; 364/200

[56] References Cited

U.S. PATENT DOCUMENTS

| | | | |
|---|---|---|---|
| 4,096,571 | 6/1978 | Vander Mey | 395/425 |
| 4,395,753 | 7/1983 | Comfort et al. | 364/200 |
| 4,556,939 | 12/1985 | Read | 364/200 |
| 4,627,055 | 12/1986 | Mori et al. | 364/200 |
| 4,698,746 | 10/1987 | Goldstein | 364/200 |
| 4,785,394 | 11/1988 | Fischer | 364/200 |
| 5,006,979 | 4/1991 | Yoshie et al. | 364/200 |

*Primary Examiner*—Dale M. Shaw
*Assistant Examiner*—Diane Evensen Smith
*Attorney, Agent, or Firm*—Lawrence D. Cutter

[57] ABSTRACT

A synchronization controller is provided for each processor in a multiprocessor system. The synchronization controllers are commonly connected to a synchronization signal bus. Each of the synchronization controllers has a synchronization wait signal transmitting means for receiving a synchronization request signal from a corresponding processor, signal means for transmitting a synchronization wait signal to the synchronization signal bus, a synchronization register for specifying the other processors to be synchronized with the corresponding processor, a comparator means for comparing the signal from the synchronization signal bus with the content of the synchronization resister, and a means for transmitting to the corresponding processor a synchronization-acknowledge signal based on the result of comparison by the comparator means.

10 Claims, 11 Drawing Sheets

FIG. 9 IMPLEMENTATION OF CLUSTER —TO— CLUSTER SYNCH CONTROLLER

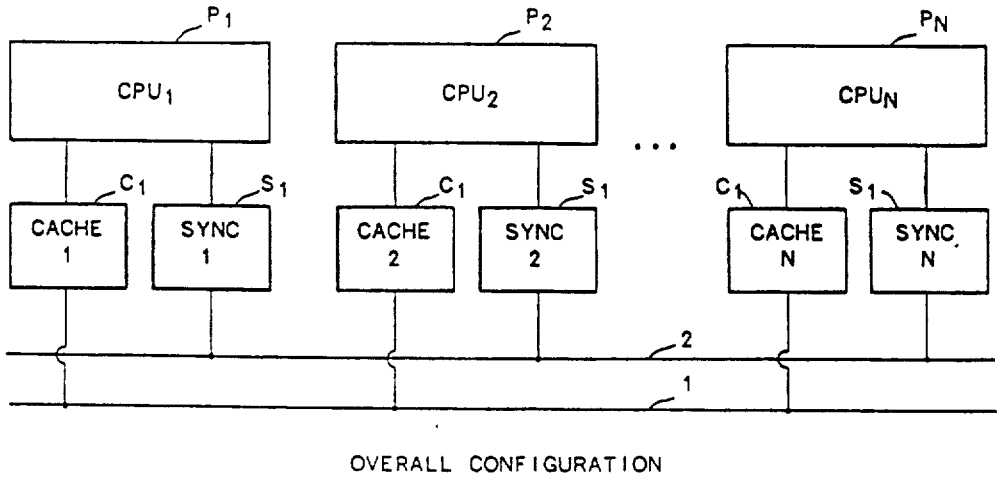
OVERALL CONFIGURATION
FIG. 1
FIG. 2A
PREFIX TYPE
| SYNC PREFIX |
| Inst 1 |
| Inst 2 |
| Inst 3 |
| SYNC PREFIX |
| Inst 4 |
| Inst 5 |
| Inst 6 |
PROCESS TIME INTERVAL 1 (Inst 1–3)
PROCESS TIME INTERVAL 2 (Inst 4–6)
FIG. 2B
SYNC TAG TYPE
| 1 | Inst 1 |
| 0 | Inst 2 |
| 0 | Inst 3 |
| 1 | Inst 4 |
| 0 | Inst 5 |
| 0 | Inst 6 |
↑ Sync tag
PROCESS TIME INTERVAL 1 (Inst 1–3)
PROCESS TIME INTERVAL 2 (Inst 4–6)
ADDITION OF SYNC INFORMATION
TO PROCESS TIME INTERVAL
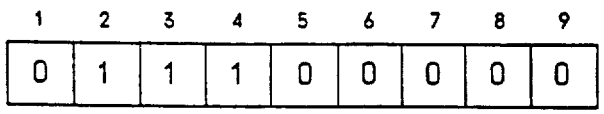
SETTING OF SYNCH REGISTER
FIG. 6

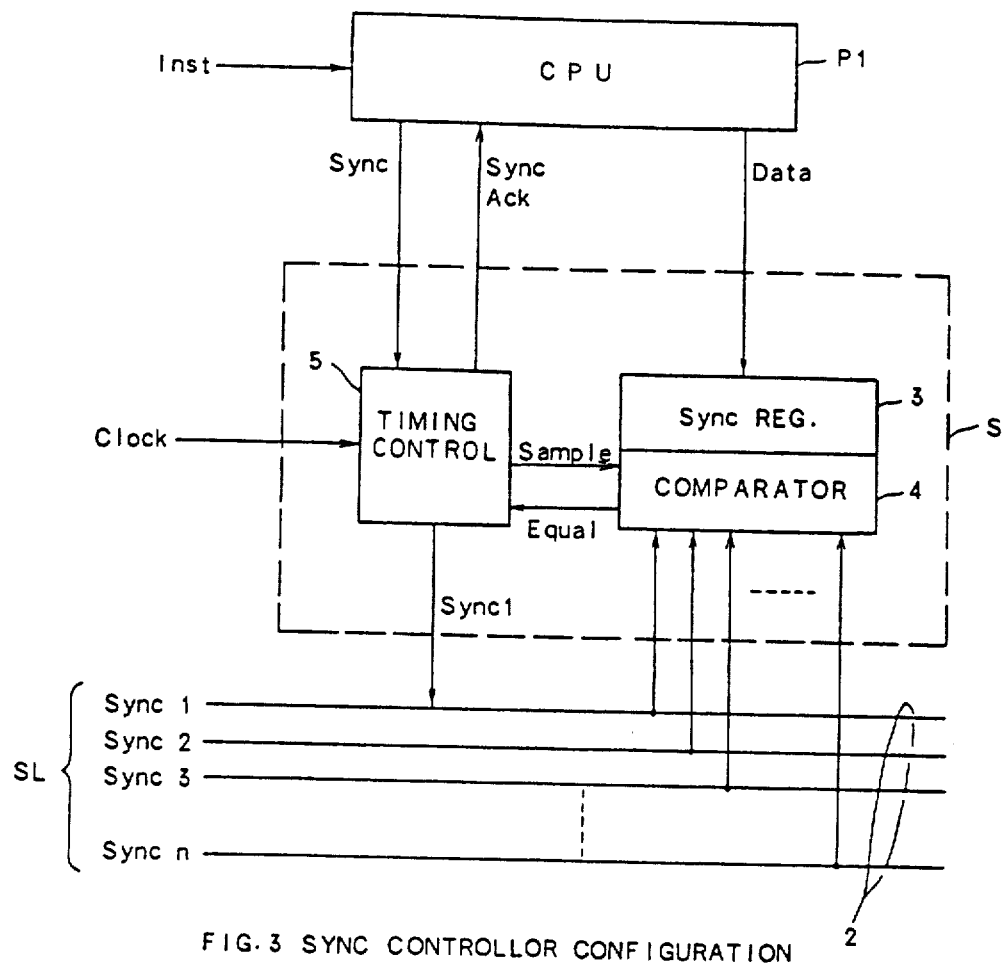
FIG. 3 SYNC CONTROLLOR CONFIGURATION
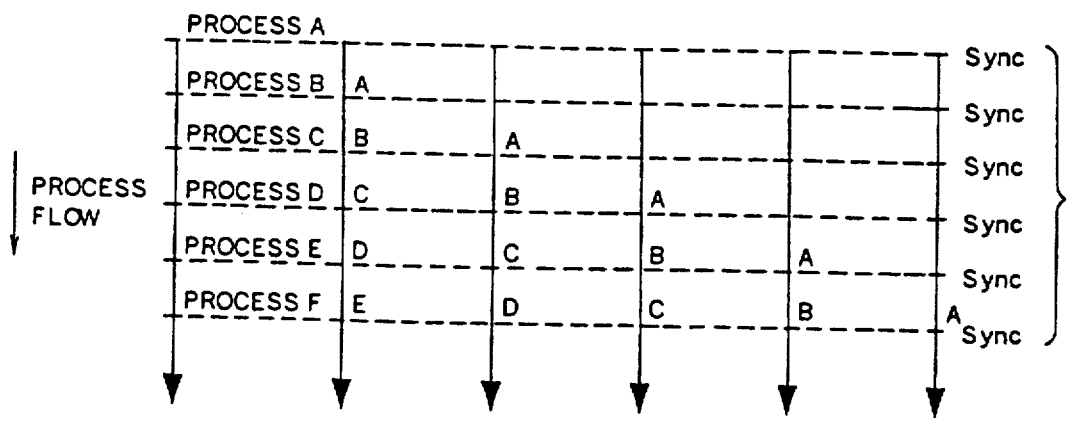
FIG. 12 CONVENTIONAL COMPILATION PROCESS

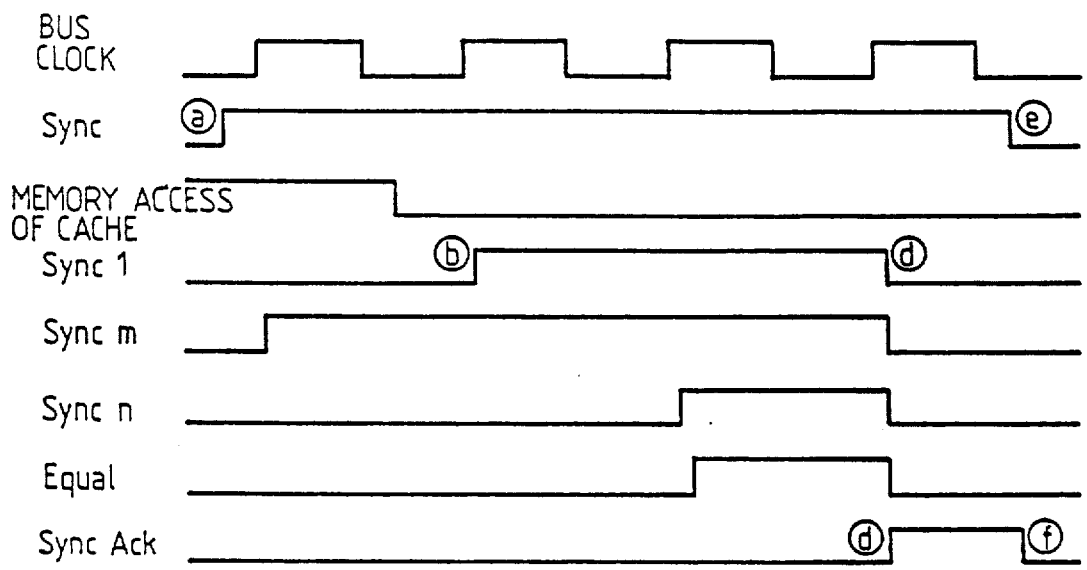
TIMING OF SYNC. CONTROL
FIG. 4
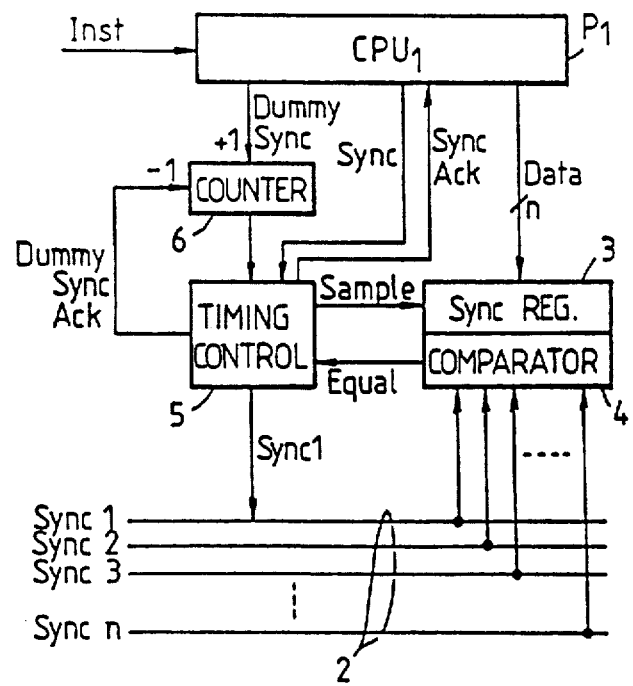
CONTROL OF PROCESSOR ISSUING DUMMY SYNC REQUEST

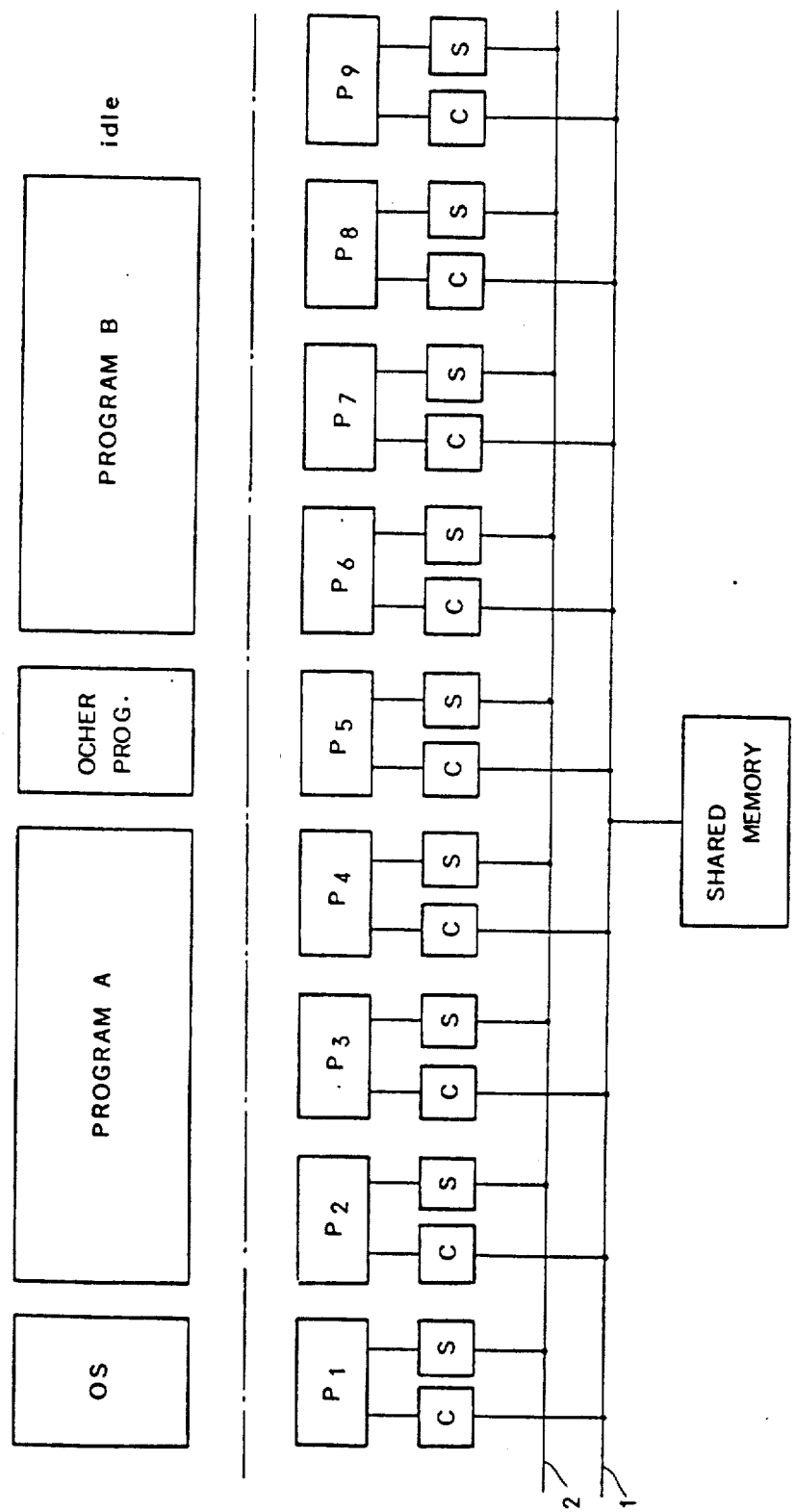
FIG.5 EXCUTION OF PARALLEL PROCESSING PROGRAM UNDER CONTROL OF OS

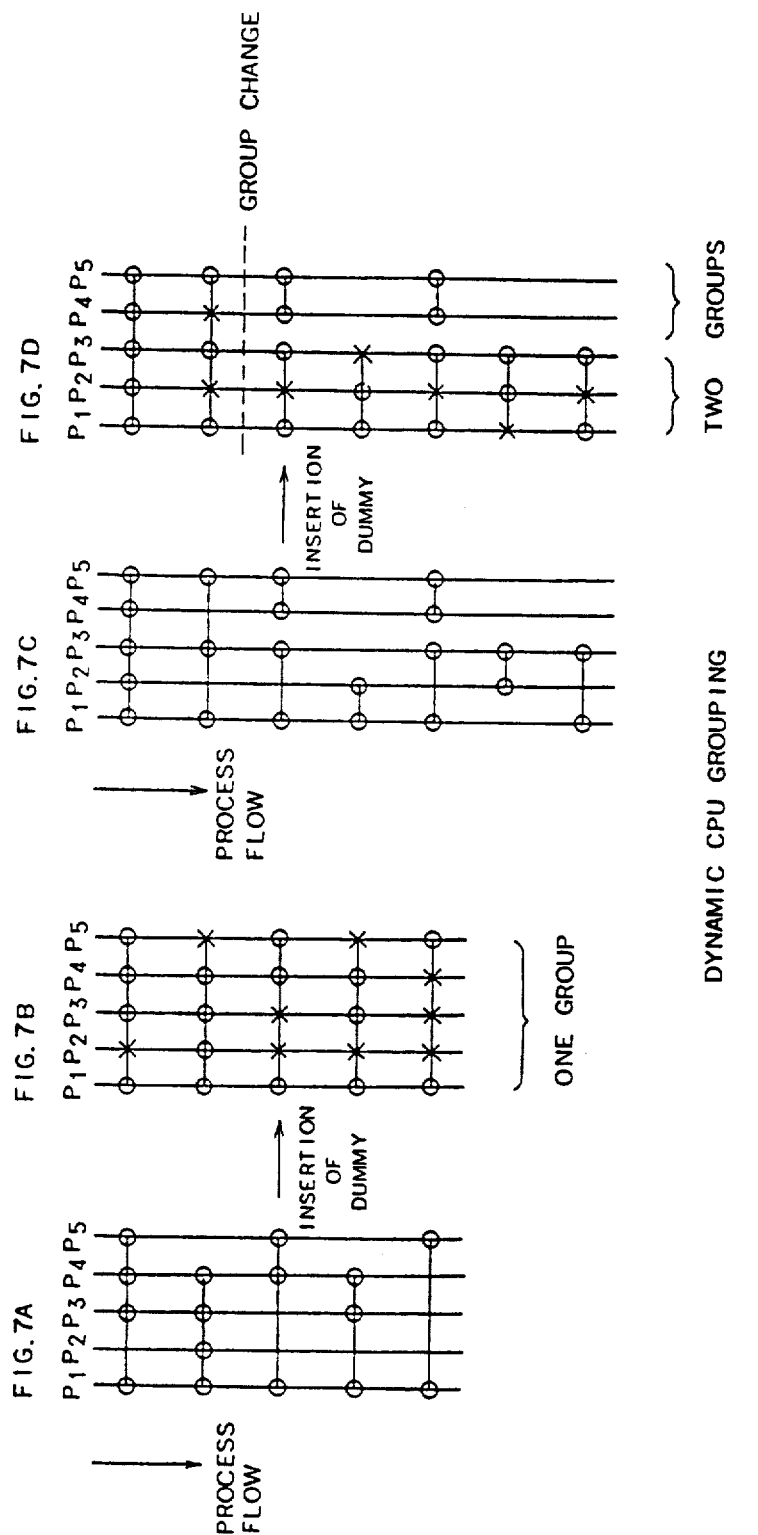

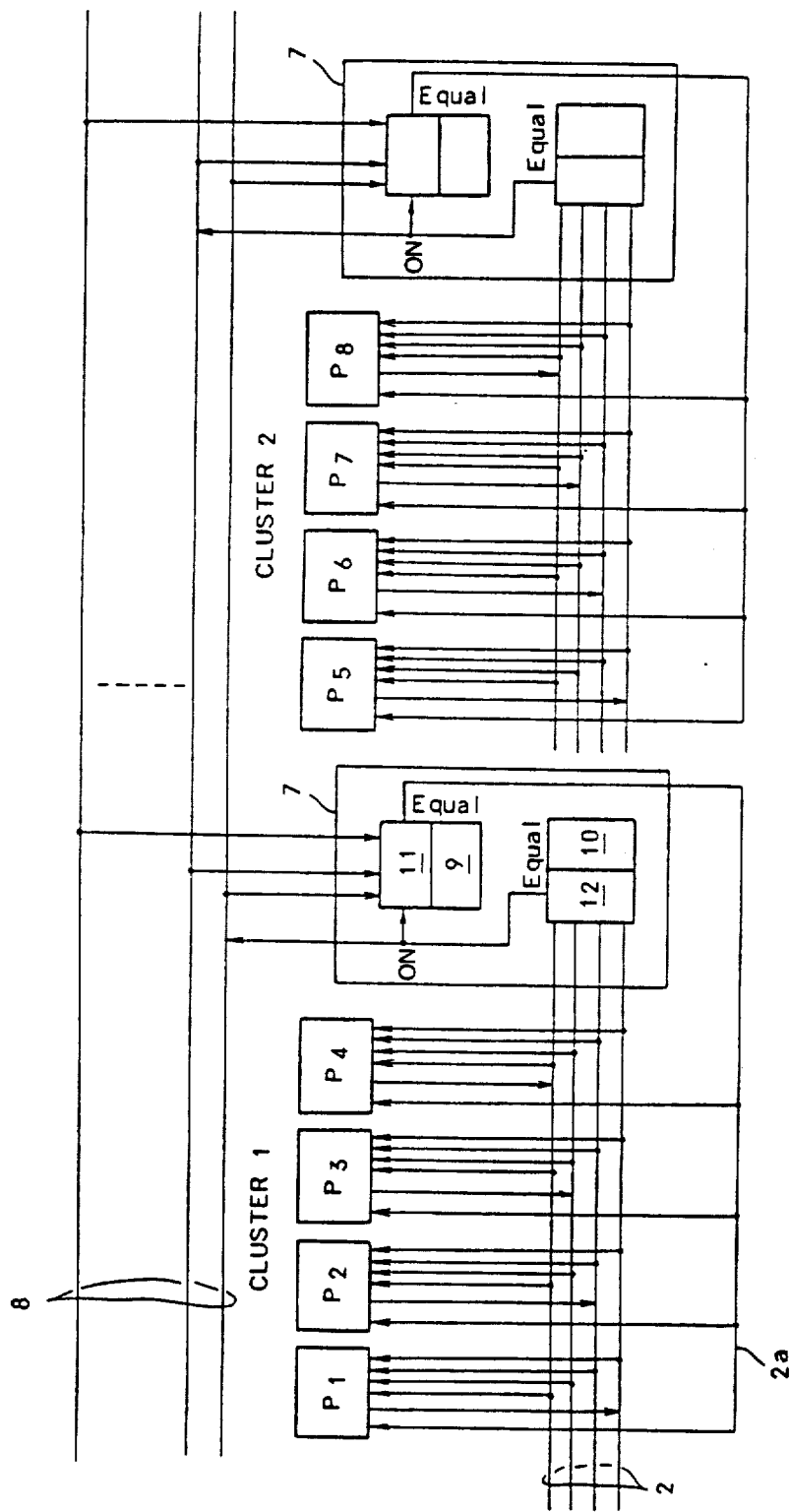
FIG. 9 IMPLEMENTATION OF CLUSTER -TO- CLUSTER SYNCH CONTROLLER

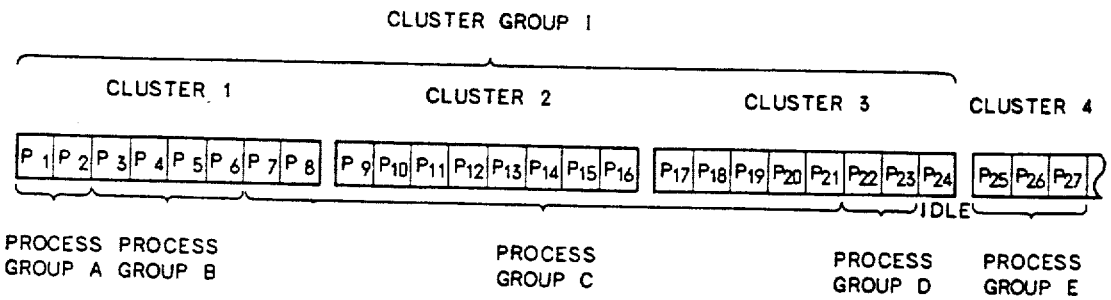
FIG. 10 PROCESS GROUPING THROUGH CLUSTERS
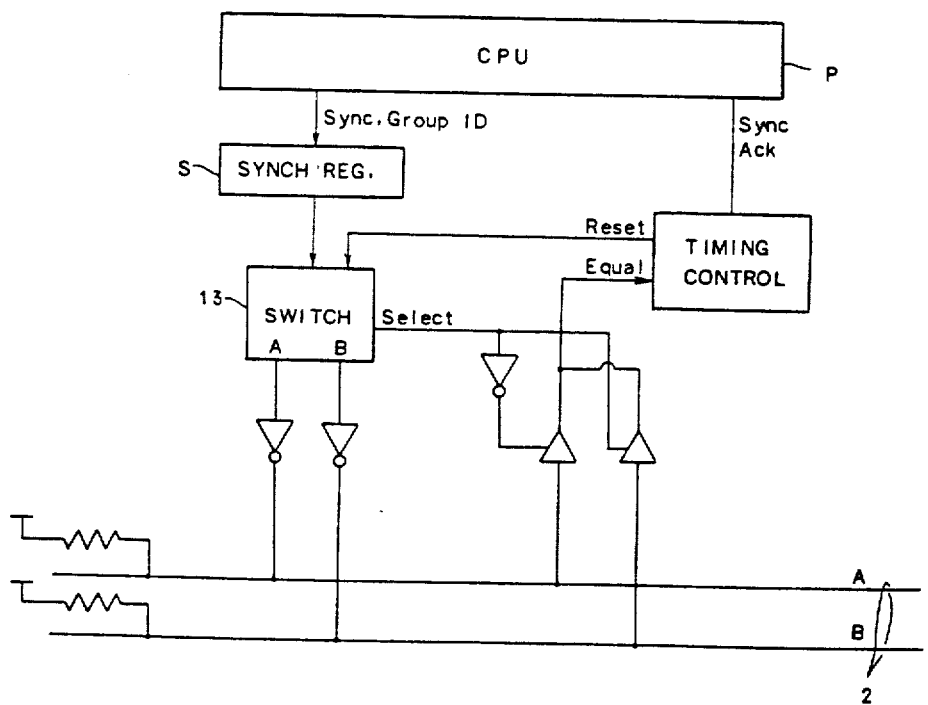
FIG. 11 CONFIGURATION WITH RUDUCTION OF SYNC SIGNAL NUMBER

```
for ( i = 2 ; i <= 5 ; i++ ) {
    B(i) = A(i-1)+C(i)      ---------------- S1
    A(i) = E(i)*2+7         ---------------- S2
    D(i) = P**Z+ Sin(m)     ---------------- S3
    F(i) = D(i-1)-5         ---------------- S4
    E(i) = X**2+y**2        ---------------- S5
    Z(i) = F(i-2)*G(i)      ---------------- S6
```
FIG.13A
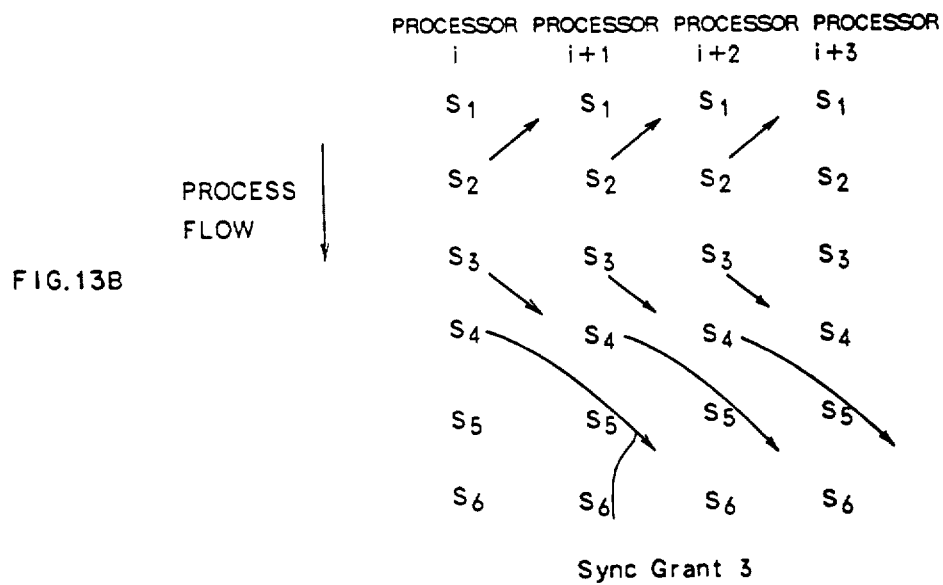
FIG.13B
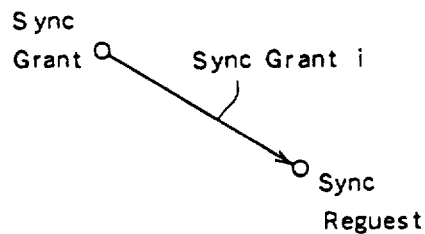
FIG.13C

VLIW TYPE COMPILER

LOOP EXPANSION AND MUTUAL EXCLUSION

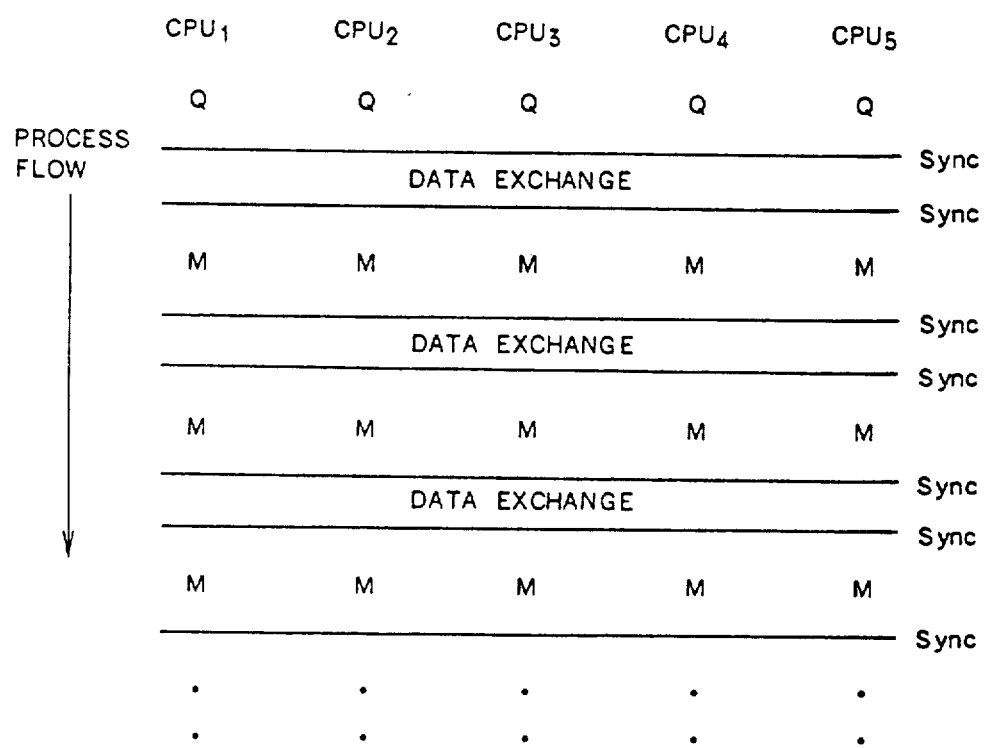
FIG. 17 PARALLEL SORT

MULTIPROCESSOR SYSTEM HAVING SYNCHRONIZATION CONTROL MECHANISM

BACKGROUND OF THE INVENTION

1. Field of the Invention

The present invention relates to a multiprocessor system, and more particularly to such a system which provides synchronization among processes each dispatched to processors.

2. Related Art

Two key factors in parallel processing are accurate performance of data transfers among divided processes and maintenance of the execution sequence of the processes. In order to determine appropriate timing for such data transfers or the like, synchronization needs to be achieved among the processes.

Synchronization of processes is usually performed through a memory. A variable is placed in the memory, for acknowledging the establishment of synchronization. Processes to be synchronized with one another lock the bus and read/write the variable, and they consequently ascertain that synchronization has been achieved. The reason why the bus is locked is because the consistency of the variable may be destroyed if one process is allowed to read and write the variable while another process reads or writes it.

The realization of synchronization by use of a read/write of a variable in the memory is effective if the number of processes to be synchronized is small and if the frequency of synchronization is small. However if the number of processes to be synchronized is large and the synchronization is frequently performed, realization of synchronization through a memory is inefficient.

Since only one processor can hold the bus to make reference to the memory at a time, the synchronization through the memory causes serialization of processes. In addition, the more frequently the bus is locked, the more the other processing is affected, which results worse performance of the multiprocessor system as a whole. Further when an instruction sequence between consecutive synchronizations includes only a few steps, the ratio of overhead by instructions required to provide the above synchronization over total overhead increases.

Accordingly, in an application where parallelism is much exploited and frequent synchronization is needed, synchronization among processes assigned to processors needs to be performed at a high speed by a technique that does not use a memory and a shared common bus. Several techniques have been previously proposed.

For example, there is available a technique for lessening the frequency of access to a shared bus and a shared memory by adding special registers for synchronization and communication between processors, aside from the shared memory. According to this technique, the processors determine whether they should execute the processes or stay busy-waiting, while repetitively reading the contents of the registers, so that synchronization among the processors are attained ("Stellix: UNIX for a Graphics Supercomputer", Proceedings of the Summer 1988 USENIX Conference, June 20-24, 1988, San Francisco Calif. USA, USENIX Association, pp. 321-330 Thomas J. Teixeira and Robert F. Gurwitz).

According to another approach, a register for synchronization is added to each register. These additional registers are connected through a bus used exclusively for synchronization. Each processor can determine the values in the registers exclusive for synchronization for other processors by snooping the bus exclusive for synchronization. In this approach, each processor also determines whether it should execute the processing or stay busy-waiting, while repetitively reading the contents of the registers, so that synchronization among the processors is attained. Each processor snoops and then updates its content, so that the frequency of access to the bus exclusive for synchronization may decrease However, the contents of the registers can not be changed at a high speed because of contention among signals on the bus exclusive for synchronization. In this approach, each processor also determines whether it should execute the processing or stay busy-waiting, while repetitively reading the content of the register, so that synchronization among processors is attained. ("VLSI Assist for a Multiprocessor", Proceedings of the Second International Conference on Architectural Support for Programming Languages and Operation Systems, October 1987, pp. 10-20, Bob Beck, Bob Kasten and Shreekant Thakkar, 1987 ACM, pp. 10-20).

The above-described methods are effective in that they can reduce the frequency of using the shared bus and the shared memory, and can provide excellent system performance. However, they do not solve the problem of process serialization that leads to increase of overhead for synchronization because all processors must be busy-waiting for attaining synchronization and are forced to access the bus exclusive for synchronization while avoiding contention to this bus.

Another conventional solution to the problem of synchronization is described in Japanese Published Examined Patent Application No. 63-14387. According to the technique disclosed by this application, a synchronization controller is provided for each processor, and synchronization control lines are employed for communication of synchronization signals.

Japanese Published Unexamined Patent Application No. 59-24364 discloses a data flow type processing system in which token lines for receiving tokens (process termination signals) from each processor and firing signal lines for receiving firing signals to the processors are arranged in a matrix, and the intersection connecting states are set by flip-flops to permit dynamic change of intertask connections.

SUMMARY OF THE INVENTION

It is an object of this invention to provide a synchronization controller, for use in a multiprocessor system, that can attain frequent synchronization among the processes assigned to each processor, at a higher speed than presently provided by conventional systems and methods. It is a further object of this invention to provide a system that can more flexibly establish grouping of the processors in a manner such that a plurality of programs for parallel processing can be concurrently executed more efficiently.

In order to attain the above object, a synchronization controller is provided for each processor in a multiprocessor system. These synchronization controllers are commonly connected to a synchronization signal bus Each of the synchronization controllers has a synchronization wait signal transmitting means for receiving a synchronization request signal from a corresponding processor and transmitting a synchronization wait signal to the synchronization signal bus, a synchronization register for specifying the other processors to be synchronized with the corresponding processor, a comparator means for comparing the signal from the synchronization signal bus with the content of the synchronization resister, and a means for transmitting to the corresponding processor a synchronization-acknowledge signal based on the result of comparison by this comparator means.

BRIEF DESCRIPTION OF THE DRAWINGS

FIG. 1 is a block diagram showing an overall embodiment of the invention;

FIG. 2, comprising FIGS. 2A and 2B, is a diagram for illustrating instructions used by the embodiment of FIG. 1;

FIG. 3 is a block diagram showing the configuration of the synchronization controller S of the embodiment of FIG. 1;

FIG. 4 is a timing chart for illustrating the operation of the synchronization controller S of FIG. 3;

FIG. 5 is a diagram showing the grouping of processors by an operating system;

FIG. 6 is a diagram showing the state of the synchronization register 3 at the time of the grouping of FIG. 5;

FIG. 7, comprising FIGS. 7A-7D, is a diagram showing dummy synchronization instructions and change of the group of processors;

FIG. 8, comprising FIGS. 8A-8C, is a block diagram showing a modification of the synchronization controller S designed to efficiently process the dummy synchronization instruction;

FIG. 9 is a block diagram showing another embodiment of the invention, which implements the synchronization control in a hierarchy;

FIG. 10 is a diagram showing the embodiment of FIG. 9;

FIG. 11 is a block diagram showing another embodiment, in which the number of synchronization signal lines is reduced by assigning each synchronization signal line to each processor group;

FIG. 12 is a diagram showing the pipeline processing;

FIG. 13, comprising FIGS. 13A-13C, and FIG. 14 are diagrams showing still another embodiment, in which the overhead is kept small by reducing the frequency of synchronization; and FIGS. 15, 16 and 17 are diagrams showing examples of application of the invention.

KEY

Figure 14:
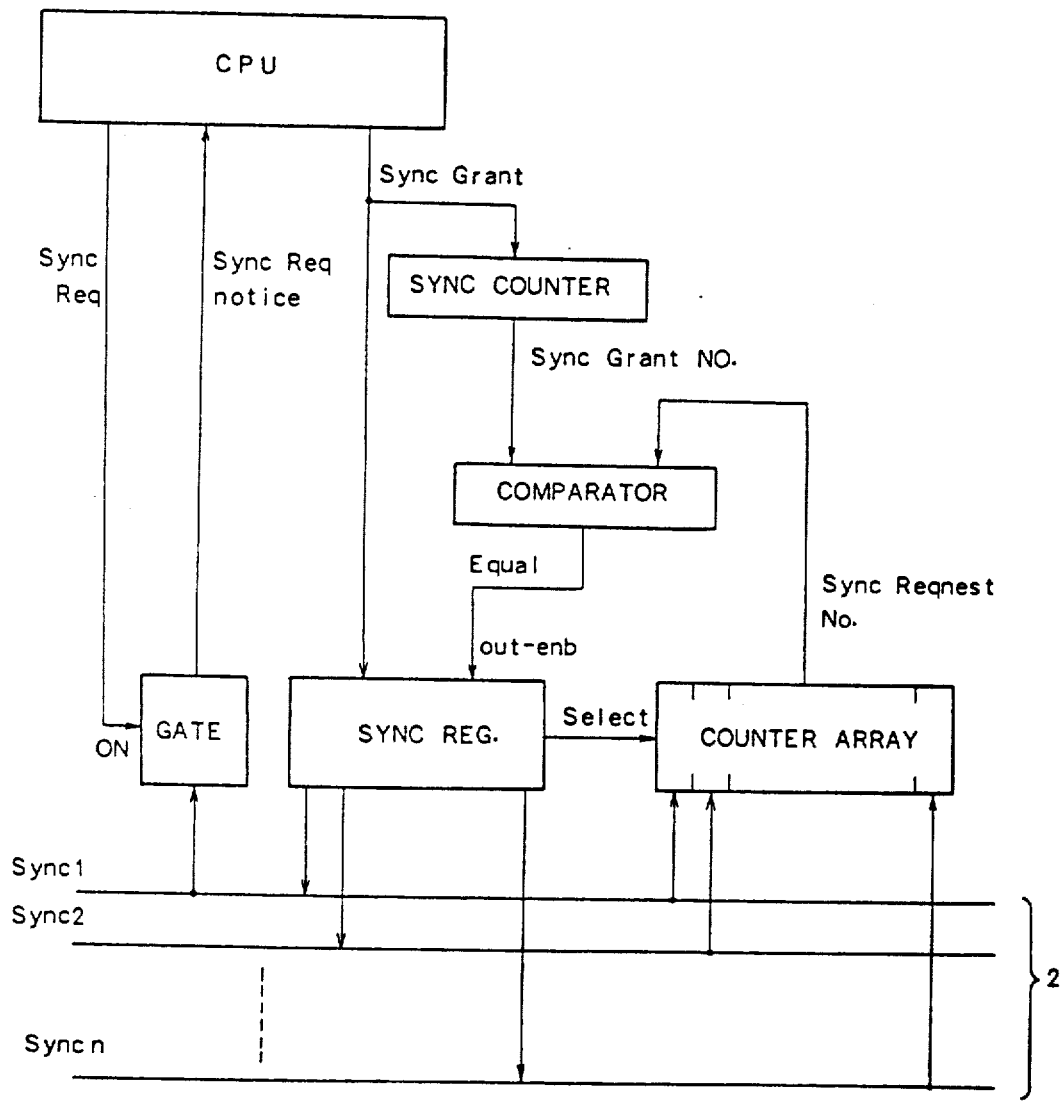

P ... Processor, C ... Cache, S ... Synchronization controller, SL ... Synchronization signal line, 2 ... Synchronization signal bus, 3 ... Synchronization register, 4 ... Comparator, 5 ... Timing control circuit.

DESCRIPTION OF THE PREFERRED EMBODIMENTS

This invention realizes, with high efficiency, the synchronization among processes in a multiprocessor system, by providing a synchronization controller for each processor and a common synchronization bus.

When there is a need for a plurality of processors be synchronized with one another, they each suspend their execution and enter a busy-wait state until all of them generate synchronization requests The synchronization controller provided for each processor can immediately recognize the establishment of synchronization by detecting the synchronization request signals supplied from the other processors on the synchronization signal bus. In addition, the processors to be synchronized can be flexibly grouped. Each processor specifies to its synchronization controller, a group of processors to be synchronized with the processor concerned, and all processors stay busy-waiting in this group.

A preferred embodiment of this invention will be explained with reference to the drawings:

Overall Configuration

FIG. 1 shows an overall diagram of an embodiment in which the invention is applied to a tightly coupled multiprocessor system using a shared bus and shared memory configuration.

Referring to FIG. 1, a plurality of processors $P_1, P_2 \ldots P_n$ are commonly connected to a system bus 1 through caches $C_1, C_2 \ldots C_n$. The processors $P_1, P_2 \ldots P_n$ are provided with synchronization controllers, $S_1, S_2 \ldots S_n$; these synchronization controllers $S_1, S_2 \ldots S_n$ are connected in common to a synchronization signal bus 2. The synchronization signal bus 2 consists of synchronization signal lines, the number of which is equal to the number of processors. The synchronization controllers $S_1, S_2 \ldots S_n$ are connected, on the one hand, to the processors $P_1, P_2 \ldots P_n$, to accept the synchronization request signals from the processors $P_1, P_2 \ldots P_n$, and to receive group data from the processors to be synchronized. Further, the synchronization controllers $S_1, S_2 \ldots S_n$ are connected, on the other hand, to a synchronization signal bus 2 so that these controllers detect that all the processors in the group have completed the busy-waiting for synchronization by snooping the bus 2 and notify this to their corresponding processors.

Basic Operation

Into each series of processes assigned to the processors to be synchronized, synchronization instructions are inserted, as required It order to efficiently perform data transfer among processes assigned to each processor, and to maintain the execution sequence, the processors are caused to simultaneously busy-wait every time a process interval divided by the synchronization signals is executed. The synchronization of every execution of each process interval is attained at a high speed by the synchronization controllers. The detail is explained in the following.

A synchronization prefix instruction is prepared as an instruction for the processors. Alternatively, a synchronization tag is added to each instruction (FIG. 2). As the execution by a processor reaches an instruction of this type, it stops operation, while outputting outside a synchronization signal requesting synchronization just before executing the instruction. Then upon receiving a Sync-Ack signal from outside, the processor resumes the execution from the instruction. When employing existing processors, I/O instructions such as Out and Wait instructions may be utilized as the instruction for synchronization, with Wait-Ack signal used as a Sync-Ack signal, thereby realizing the execution of the process interval divided by the synchronization instructions, and the synchronization of the processors.

The synchronization controller S comprises, as shown in FIG. 3, a synchronization register 3, a comparator 4 and a timing control circuit 5. It should be noted that to refer to any arbitrary synchronization controller, the suffixes are omitted. The same applies to other reference numerals. It is assumed that all synchronization controllers $S_1, S_2 \ldots S_n$ in the system are driven by the same clock. Each of synchronization signal lines $SL_1, SL_2 \ldots SL_n$ on the synchronization signal bus 2 is assigned to each of the processors $P_1, P_2 \ldots P_n$ to transmit synchronization signals from the processors $P_1, P_2 \ldots P_n$ therethrough. The synchronization register 3 has a bit length corresponding to the number of processors. The bit corresponding to the processor P to be synchronized is set to 1. The comparator 4 samples the data on the synchronization signal bus 2 every one clock or one-half clock, and compares it with the data in the synchronization register 3. The timing control circuit 5 conducts reception of the Sync signal and return of the Sync-Ack signal according to the clock. In the following, the operation procedure is explained (FIG. 4):

- (a) The processor P outputs a Sync signal just before execution of an instruction requiring synchronization, and suspends the execution until the Sync-Ack signal is inputted.
- (b) The synchronization controller S, upon receiving the Sync signal, outputs it to the signal line SL of the synchronization signal bus 2 assigned thereto at the leading edge of the next clock.
- (c) The synchronization controller S continues to snoop (monitors) the synchronization signal bus 2 until all signal lines SL of the synchronization signal bus 2 corresponding to the bits of its synchronization register 3, to which 1 is set, become active.
- (d) As the above-mentioned conditions are met, it ends the outputting of the Sync signal to the synchronization signal bus at the leading edge of the next clock, and outputs a Sync-Ack signal to the processor P.
- (e) The processor P, upon input of the Sync-Ack signal, ends the outputting of the Sync signal, and resumes the execution of the instruction.
- (f) The synchronization controller S, in response to this action, ends the outputting of the Sync-Ack signal.

If it cannot be guaranteed that access to the system bus 1 by the cache C has completed at the stage of (b), the output of the Sync signal to the synchronization signal bus 2 needs to stay waiting until this access completes.

Grouping of Processors

Under a multi-user environment, it is not easy to assign all processors P in a system for execution of an application which can perform parallel processing. For effective utilization of a processor resource, it is necessary to group processors to synchronize the processors P in the same group. Accordingly, the synchronization controller S sets 1 to the bit of the synchronization register 3 corresponding to the processor P in the group. Normally, the operating system does this setting.

FIG. 5 shows how user programs A and B, which require a plurality of processors $P_1, P_2 \ldots$, are concurrently executed under the control of an operating system OS. An example of an operation of an operating system OS and an example of synchronization control by the grouping of processors P are explained in the following:

Referring to FIG. 5, one $P_1$ of the processors P constituting the multiprocessor system is assigned to its operating system OS. All remaining processors $P_2 \ldots P_n$ are assigned to the execution of the user program. The operating system OS detects idle processors $P_2, P_3$ and $P_4$, and assigns to them an executable program A. At this time, bits of the synchronization registers 3 of the synchronization controllers $S_2, S_3$ and $S_4$ belonging to the assigned processors $P_2, P_3$ and $P_4$ are set as shown in FIG. 6. In that way, synchronization within the group of processors assigned to the program A can be attained. In a similar way, the synchronization within the processor group assigned to the program B can be simultaneously attained.

Now, addition of a dummy synchronization request is described:

When all processors P belonging to a given group are synchronized, sometimes, a subset of the processors need not be synchronized. On such an occasion, a dummy synchronization request signal is added to a series of instructions assigned to the processors P that need not to be synchronized. FIGS. 7A and B show a dummy request. FIG. 7A shows a flow of actual processes, with circles indicating processes to be synchronized. In this example, since processors $P_1, P_2 \ldots P_5$ are assumed to be in a group, even if only one of them does not issue a synchronization request, or does not produce a circle, the entire processing continues to be suspended. For this reason, as shown by cross marks in FIG. 7, dummy request signals are appropriately inserted. The dummy synchronization request signals do not badly affect the processing performance.

If part of processors P need not to be synchronized with other processors P for a long period of time, the grouping of the processors P is dynamically changed, as shown in FIGS. 7C and D, by rewriting the synchronization register 3. In FIG. 7D, they are divided into two groups at the position indicated by a broken line.

In this example, the program should be examined in advance, and the dummy request inserting positions should be determined in accordance with the number of steps or the like.

In the above-mentioned method, issuance of the dummy synchronization requests causes processors, which need not to be synchronized, to busy-wait. By the method described in the following, processors, which need not to be synchronized, may proceed with their execution up to a point where the synchronization is really attained.

As shown in FIG. 8, information for notifying the synchronization controller S that the synchronization is a dummy is added to a synchronization instruction, a prefix instruction or a synchronization tag. When processor P issues a dummy synchronization instruction, it proceeds with its execution without waiting for other processors P. The synchronization controller S needs to retain the number of dummy synchronization instructions that are not yet processed. Therefore, as shown in FIG. 8, a dummy request counter 6 is added to the synchronization controller S. When the processor P issues a dummy synchronization instruction, the synchronization controller S increments the dummy request counter 6. As one dummy synchronization processing is completed, the synchronization controller S decrements the dummy request counter 6. When the processor P issues a normal synchronization instruction for waiting for other processors P, the synchronization controller S processes dummy synchronization until the value of the dummy request counter 6 becomes 0, and, subsequently, processes the normal synchronization instruction. At this time, the processor suspends the execution until an Ack signal is outputted from the synchronization controller S.

Components in FIG. 8 corresponding to these of FIG. 3 are identified by similar references, for which detailed description is omitted.

Hierarchization of Synchronization Control

It is desirable for good performance that the number of synchronization signal lines corresponds to that of the processors. However, it causes increase in the amount of hardware, and is difficult to be implemented if the system consists of a large number of processors. Thus, as shown in FIG. 9, it may be possible to control the synchronization in a hierarchical manner, as well as to reduce the number of synchronization signal lines.

Referring to FIG. 9, one cluster CL is formed with several to ten and several units (4 units in the figure) of processors P. In the figure, two clusters $CL_1$ and $CL_2$ are presented. The cluster CL is physically formed and is different from the grouping of the processors P.

The processors P in the cluster CL are coupled with a synchronization signal bus 2 that consists of synchronization signal lines of the number larger by one than the number of the processors P, with the number of processors P fixed. Within the cluster CL, the synchronization based on the grouping of processors P may be attained without restriction.

Each cluster CL is equipped with a cluster-to-cluster synchronization controller 7. The cluster-to-cluster synchronization controller 7 attains synchronization between clusters CL through a cluster-to-cluster synchronization signal bus 8 consisting of signal lines, the number of which is equal to the number of clusters. Similar to the synchronization based on grouping of processors P, the clusters CL can be grouped. One cluster CL can not belong to two or more cluster groups in an overlapping manner because it is not possible to distinguish for which group the synchronization is to be attained. Further, grouping of processors P across the clusters CL may be performed under the following limitations. That is, only one grouping of processors across the clusters CL is permissible on one cluster group because, also in this case, it is not possible to determine to which group the synchronization is to be attained. FIG. 10 shows synchronizations based on groupings of processors within single clusters and those across the clusters CL.

The cluster-to-cluster synchronization controller 7 has in its inside a cluster group synchronization register 9 and a processor group synchronization register 10 and, further, comparators 11 and 12 corresponding to these synchronization registers 9 and 10. The cluster group synchronization register 9 specifies cluster groups to be synchronized. The processor group synchronization register 10 specifies the processor group which participates in synchronization across the clusters CL.

In the following, a detailed explanation will be given on how to attain the synchronization of the processors by using the cluster-to-cluster synchronization controller 7.

(a) The cluster group and the processor group to be synchronized are specified to the cluster group synchronization register 9 and the processor group synchronization register 10 in the cluster-to-cluster synchronization controller 7, respectively.

(b) The cluster-to-cluster synchronization controller 7 snoops the synchronization signal bus 2 until all processors P specified by the processor group synchronization register 10 output Sync signals.

(c) When all the synchronization signal lines assigned to the specified processors P become active, the cluster-to-cluster synchronization controller 7 activates the signal lines of the cluster-to-cluster synchronization signal bus 8 assigned thereto.

(d) The cluster-to-cluster synchronization controller 7 snoops the cluster-to-cluster synchronization signal bus 8 until all the clusters CL specified by the cluster group synchronization register 9 output Sync signals.

(e) When all the specified clusters CL feed Sync signals on the cluster-to-cluster synchronization signal bus 8, each cluster-to-cluster synchronization controllers 7 notifies the establishment of cluster-to-cluster synchronization to the processors P specified to the processor group register 10 by utilizing one of synchronization signal buses 2 in each cluster CL (cluster-to-cluster synchronization notifying signal line 2 ack).

As an example of implementation of the hierarchical synchronization mechanism of a large multi-processor system, a following configuration may be contemplated. That is, a large multi-processor system may be configured by mounting several processors P on a card, and connecting several cards into a box. In that way, it is easy to arrange processors P on a card as a cluster CL.

In the hierarchization of the synchronization mechanism, expansion to multi-stages may be achieved by providing a cluster-to-cluster synchronization signal bus 8 having signal lines the number of which is larger by one than the number of clusters, similar to the synchronization signal bus 2 in the cluster CL. This is obvious from the above description.

Reduction of the Number of Synchronization Signal Lines

Aside from the hierarchization of synchronization control, it may be attempted to reduce the number of the synchronization signal lines by the following method.

Briefly speaking, according to this approach, a single synchronization signal line is assigned to each processor group, and each processor is connected to each synchronization signal line through each of switches SW. Then, it makes on only the switch which is connected to the synchronization signal line corresponding to the group to which it itself belongs. The configuration will be described in detail later with reference to FIG. 11.

According to this approach, the number of signal lines of a synchronization signal bus may be reduced to one-half. For example, if the number of processors is ten, the number of signal lines of the synchronization signal bus may be reduced to five. This is obvious from the following. That is, the maximum number of groups should be the number of processors divided by the minimum number of processors that can constitute a group. Because one processor does not constitute a group, the minimum number of processors is two. Accordingly, the number of signal lines is one-half the number of processors, as above-described.

FIG. 11 shows a configuration of the synchronization controller S and the synchronization signal bus 2 in a case where the number of processors is four and the number of synchronization signal lines is two.

To the synchronization signal line SL assigned to each of the processor groups, a synchronization request line from a synchronization controller S is wired OR, where the operation is on negative logic. The synchronization controllers S for all processors P in a group previously feed low level signals to a signal line SL assigned to that group. When a synchronization request is issued from any processor P, its synchronization controller S stops feeding of the low level signal. As all the processors P in the group issue the synchronization, the level of the signal line SL turns high so that the completion of the synchronization between all the processors can be detected.

Referring to FIG. 11, the synchronization controller S consists of a synchronization register 3, a timing control circuit 5 and a switch 13. The synchronization register 3 specifies whether to issue the synchronization or not and which processor group is to be synchronized. The switch 13 feeds a Sync signal in advance to one of the synchronization signal lines $SL_A$, and $SL_B$ which are assigned to the processor groups as specified by the synchronization register 3. When the processors P issues a synchronization request, the signal is stopped to be fed. The timing control circuit 5 snoops the signal lines SL assigned to the group. When the signal line SL becomes the high level, it outputs an Ack signal to the processors P, thereby notifying them of completion of synchronization. Furthermore, the timing control circuit 5 enables the next synchronization request from the processors P by causing the switch 13 to resume the feeding of the Sync signal after a predetermined period of time.

Implementation of High Speed Pipeline Control

The method causing all processors P in one group to be simultaneously synchronized is effective not only when the processing to be executed in parallel stays waiting every time at the synchronization point, but when each processing can not be executed in parallel and needs to be executed by a pipeline system. The pipeline system may be accomplished by sliding, as required, the execution of the processing assigned to each processor. In order to correctly hold this sliding interval, it is necessary for all processors to be simultaneously synchronized, as shown in FIG. 12.

In a case where parallel processing by the pipeline system are concerned, the number of synchronization instruction inserted increases when the sliding interval of the pipelines is small and the number of processors is large. Therefore, the number of synchronization instruction inserted may be kept small by providing a system in which processors in a group are synchronized in a predetermined sequence.

For example, when a loop statement as shown in FIG. 13A is executed, each processor performs the processing as shown in FIG. 13B. In the parenthesis in FIG. 13A, i=2 represents the initial value, i<=5 a check condition, and i++ an increment. The arrows in FIG. 13B signify that, as shown in FIG. 13C, first a synchronization is established between a processor which has issued the synchronization grant, and a corresponding processor which has issued the synchronization request, and that the notification of Sync Grant i is issued.

As is clear from FIG. 13B, by permitting two or more synchronization sequences to be simultaneously specified, parallel processing by way of a complex pipeline system can be supported. In the example of FIG. 13B, synchronization is attained in the sequence of processor i, processor i+2 and processor i+4, while attaining synchronization in the sequence of processor i, processor i+1, and processor i+2.

In this way, all processors are not stopped every time, resulting in reduced overhead.

When synchronization is attained in the sequence as specified above, the synchronization request/grant sequence in each processor needs to be maintained. Then, in the following example, the fact that the frequency of synchronization grant matches the frequency of synchronization request is utilized. For example, it is understood, as shown in the figure, that synchronization grant 3 from the processor i to the processor i+2 is the third synchronization grant in the processor i, and is also the third synchronization request in the processor i+2. Accordingly, the processor that receives the synchronization request is able to appropriately issue synchronization grant by counting the frequency of synchronization request from the synchronization requesting processor. By realizing the above-described mechanism with hardware, the overhead for synchronization can be reduced.

To realize the system, a synchronization controller S such as shown in FIG. 14 is necessary. However, no change in the connection and the configuration of the processor P, the synchronization controller S and the synchronization signal bus is made.

Referring to FIG. 14, the synchronization controller S consists of a synchronization register 3, a synchronization counter 14, a comparator 4, a counter array 15 and a gate 16. The processor P every time sets in the synchronization register 3 the identifier for the processor P from which the synchronization should be received, to issue a synchronization grant. The synchronization counter 14 retains the frequency of the synchronization grant Each counter which constitutes the counter array 15 is assigned to each processor P to detect the signals which are fed on the synchronization signal bus 2, thereby retaining the frequency of synchronization request from each processor P. The comparator 4 compares the frequency counted by the synchronization counter 14 with that of synchronization request from each synchronization requesting processor P, and feeds a synchronization grant signal when their values are found in agreement. The gate 16, upon receiving the synchronization grant signals from other processors P, feeds an Ack signal to these processors, thereby notifying them of establishment of synchronization.

Examples of Usage

Three examples of a very large instruction word (VLIW) type compiler, loop expansion, and parallel sort are explained in the following as methods effectively utilizing the invention.

Figure 15:
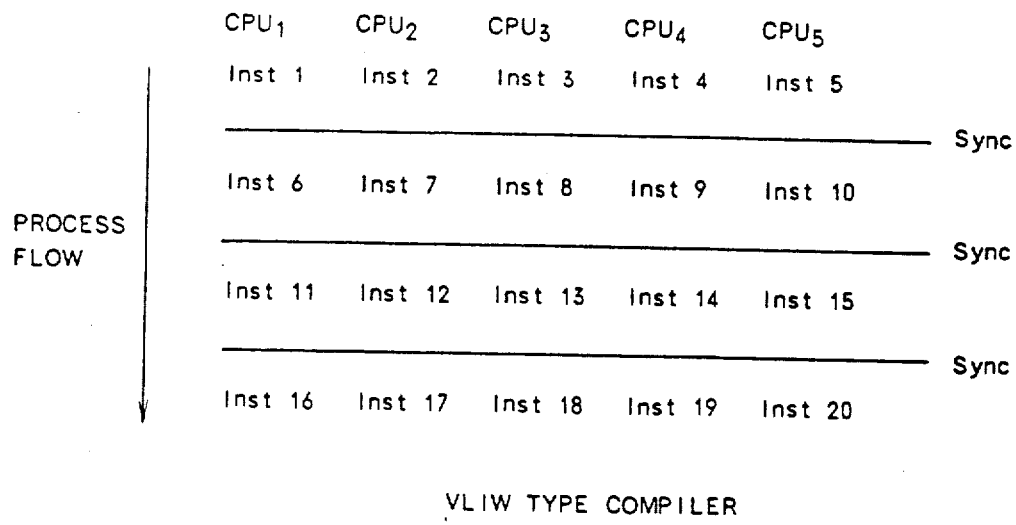

A VLIW type compiler divides an ordinary sequential program into segments with a length of about one instruction, and assigns them to a number of processors, thereby extracting the parallelism possessed by the program (FIG. 15). At this stage, in order to maintain the sequential relationship of the instructions, it is necessary to synchronize the processors every time an instruction is executed. In addition, it is important to keep small the proportion accounted for by the overhead required for synchronizing the processors in the total processing of the program. This invention is effective in meeting these demands.

Figure 16:
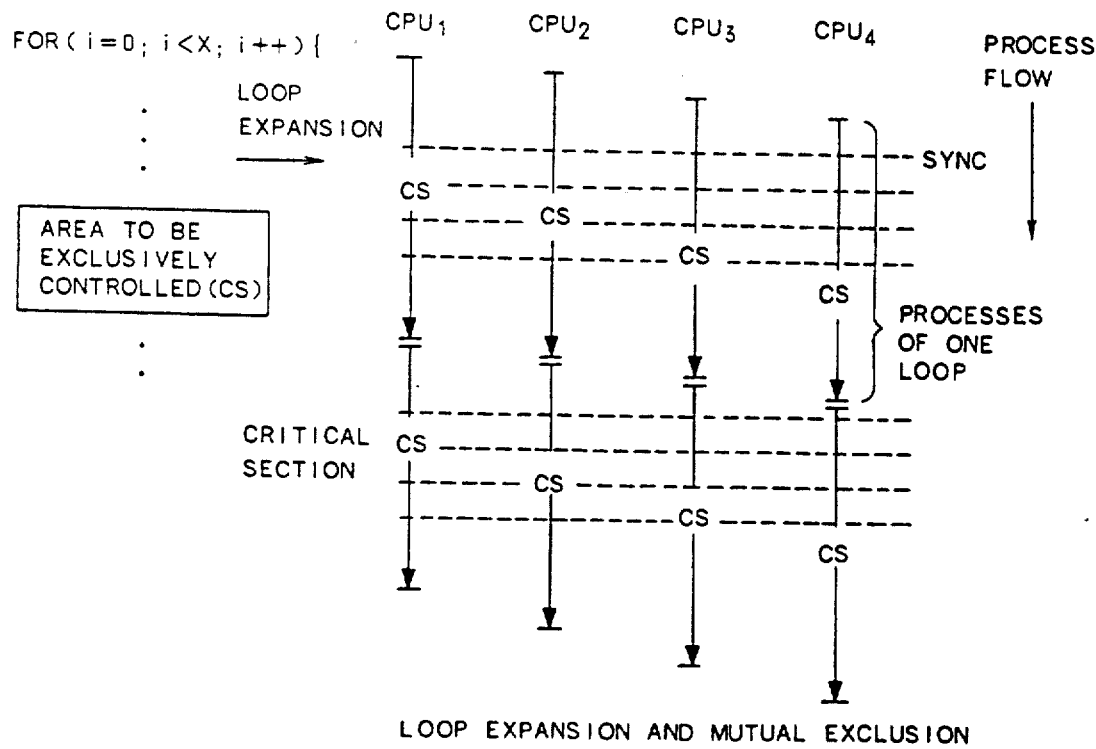

Loop expansion is a method of parallel processing by assigning repetition of DO loop statements or the like, to a plurality of processors as shown in FIG. 16. In the loop expansion, shared data is frequently referenced during each repetition. In order to accurately perform read/write of the shared/data, the write to the shared data by each repetition needs to be exclusively controlled. Then a high speed exclusive control can be performed by sliding the repetition of the loop slightly when it is performed, and by synchronizing the processors every time when write is performed to the common data.

A parallel sort that is a combination of a quick sort Q and a merge sort M is an algorithm for carrying out the sorts at a high speed using a plurality of processors (FIG. 17). The quick sort Q is performed in the first cycle, with the data to be sorted assigned to a plurality of processors. In the next cycle, parts of data are exchanged with neighboring processors and, then, the merge sort M is conducted. In the subsequent cycles, the exchange of parts of data and the merge sort M are repeated until entire data are completely sorted. In the parallel sort, the processors are required to be synchronized at a high speed before and after exchanging parts of data with neighboring processors, with the quick sort Q or the merge sort M ended at each cycle. This invention efficiently executes changeover between the sorts and the data exchange.

The data delivered between processors resides at the time of synchronization in the cache for each processor under cache protocol of update type, so that high speed data delivery may be expected between processors.

Advantages of the Invention

As described in the above, according to this invention, it becomes possible that the synchronization groups between the processors can be arbitrarily varied by setting the bit data of the synchronization register in the synchronization controller provided for each processor, and that a multi-processor system is effectively used by a plurality of applications. In addition, various synchronizations including the pipeline processing can be attained by setting of the bit data. Moreover, since the state of each processor participating in the synchronization is reflected on the synchronization signal bus, it is no longer necessary to receive or feed a signal for synchronization by using that bus. Therefore, it has become possible to avoid the overhead resulting from contention for the synchronization signal bus, and to improve the throughput of the synchronization control. Of course, the loads on the common buses and the common memories can be relieved.

We claim:

1. A processor for use in a multiprocessor system, said processor comprising:
   1) request means for generating a synchronization request signal;
   2) a synchronization controller, said synchronization controller including at least:
      a) synchronization wait signal means coupled to said request means, for transmitting an outgoing synchronization wait signal to a synchronization signal bus upon receiving said synchronization request signal from said request means;
      b) synchronization register means for specifying other processors for synchronization with said processor;
      c) comparator means, coupled to said synchronization register means, for comparing an incoming synchronization wait signal from said synchronization signal bus with data contained within said synchronization register means; and
      d) transmission means, coupled to said comparator means, for transmitting a synchronization acknowledgement signal to said processor, said transmission means being responsive to comparison results from said comparator means.

2. A multiprocessor system, comprising:
   A) a synchronization signal bus;
   B) a plurality of processors, each processor including at least:
      1) request means for generating a synchronization request signal;
      2) a synchronization controller, said synchronization controller including at least:
         a) synchronization wait signal transmission means, coupled to said request means and said synchronization signal bus, for transmitting an outgoing synchronization wait signal to said synchronization signal bus upon receiving said synchronization request signal from said request means;
         b) synchronization register means for specifying at least one other of said processors in said plurality of processors, to be synchronized;
         c) comparator means, coupled to said synchronization register means and said synchronization signal bus, for comparing an incoming synchronization wait signal from said synchronization signal bus, with data contained within said synchronization register means; and
         d) transmission means, coupled to said comparator means, for transmitting a synchronization acknowledgement signal to said processor said transmission means being responsive to comparison results from said comparator means.

3. The multiprocessor system of claim 2, wherein:
said synchronization signal bus comprises a first number of synchronization signal lines, wherein said first number equals a second number of said processors in said plurality, and wherein each of said processors is coupled to a corresponding one of said synchronization signal lines by way of said synchronization wait signal transmission means;
said synchronization register means is a third number of bits in length, said third number being equal to said second number; and wherein
said comparator means comprises means for comparison of said synchronization register bits with said synchronization wait signals on said synchronization signal lines.

4. The multiprocessor system of claim 2, wherein said synchronization wait signal transmission means comprises means for generating said synchronization request signal in response to a predetermined instruction executed by one of said processors.

5. The multiprocessor system of claim 4, wherein said predetermined instruction includes at least a tag section for indicating that said synchronization request signal is to be generated, and wherein said synchronization wait signal means for transmitting comprises means for generating said synchronization request signal in response to an indication by said tag section that said synchronization request signal has been generated.

6. The multiprocessor system of claim 2, wherein said synchronization controller further comprises first counter means for counting dummy synchronization request signals and second counter means for counting said synchronization wait signals in a reverse direction to that of said dummy synchronization request signals.

7. A multiprocessor system comprising:

1) a plurality of processor clusters, each of said processor clusters comprising a plurality of processors, each processor in said plurality including at least:
   a) a cluster synchronization controller; and
   b) a processor synchronization controller;
2) a cluster-to-cluster synchronization signal bus to which said cluster synchronization controllers are commonly connected;
3) an intra-cluster synchronization signal bus and a cluster-to-cluster synchronization wait signal line provided for each of said clusters of said processors to which the synchronization controllers of the processors contained in each of said clusters are commonly connected; and wherein each of said cluster synchronization controllers includes at least:
   (i) cluster-to-cluster synchronization register means for specifying the processors in a corresponding cluster to be synchronized;
   (ii) comparator means for comparing signals from the cluster-to-cluster synchronization signal bus in said corresponding cluster with data contained within an intra-cluster synchronization register;
   (iii) means for transmitting a cluster-to-cluster wait signal to said cluster-to-cluster synchronization signal bus based on comparison results from said comparator means;
   (iv) cluster synchronization register means for specifying the cluster to have a synchronization relation with said corresponding cluster;
   (v) comparator means for comparing signals from said intra-cluster synchronization signal bus with data contained within said cluster synchronization register; and
   (vi) means for transmitting a cluster-to-cluster synchronization wait signal to the cluster-to-cluster synchronization wait signal lines of said corresponding clusters based on comparison results from said comparator means; and wherein each of said processor synchronization controllers includes at least:
   (i) synchronization wait signal transmission means for transmitting the synchronization wait signal to said synchronization signal bus, upon receiving said synchronization signal request signal from a corresponding processor;
   (ii) synchronization register means for specifying at least one other of said processors to be synchronized with said corresponding processor, and for specifying whether or not clusters exist which have a synchronized relation with each other;
   (iii) comparator means for comparing the signals from said synchronization signal bus with data contained within said synchronization register means; and
   (iv) means for transmitting a synchronization acknowledgement signal to said corresponding processor based on comparison results from said comparator means.

8. A multiprocessor system comprising:
a plurality of synchronization signal lines;
a plurality of processors, each including at least a synchronization controller connected to said plurality of signal lines;
said synchronization controller including at least:
switch means for changing a connection state between said synchronization controller and each of said synchronization signal lines;
synchronization register means, coupled to said switch means, for specifying said connection state;
synchronization wait signal transmitting means, coupled to said plurality of synchronization signal lines, for transmitting an outgoing synchronization wait signal to a first one of said synchronization signal lines selected in accordance with data contained within said synchronization register means, upon receiving a synchronization request signal;
receiver means, coupled to said plurality of signal lines and said switch means, for receiving an incoming synchronization wait signal from at least one of said synchronization signal lines and for controlling said switch means in accordance with data contained within said register means, upon receiving said synchronization request signal from said corresponding processor; and
acknowledgement means, coupled to said switch means, for transmitting a synchronization acknowledgement signal to said processor when all signals on said at least one of said synchronization signal lines are synchronization wait signals.

9. The multiprocessor system of claim 8, having a first number of synchronization signal lines, said first number being at least one half of a second number which is the number of said processors.

10. A multiprocessor system comprising:
a plurality of processors connected through a shared bus, wherein each of said processors includes at least:
means for generating synchronization grant signals to others of said processors in response to an executed instruction stream;
means for transmitting a synchronization request signal to said others of said processors in response to said instruction stream;
means for transmitting a synchronization request signal to said others of said processors in response to said instruction stream;
a synchronization controller; and
a synchronization signal bus consisting of a plurality of synchronization signal lines to which said controllers are commonly connected; and
each of said synchronization controllers including at least:
synchronization register means for specifying processors in a synchronization relationship with each other based on said synchronization grant signal;
synchronization grant signal counting means for counting the number of times that said synchronization grant signal is transmitted;
counter array means for individually counting the number of synchronization request signals on the synchronization signal lines of said signal bus for each synchronization signal line;
means for extracting count data contained within said counter array means for a corresponding synchronization signal line from said counter array means in accordance with data contained within said synchronization register;
comparator means for comparing said extracted count data, with data contained within said synchronization grant signal counting means;
means to transmit to said synchronization signal bus data contained within said synchronization register as the synchronization grant signal in accordance with comparison results from said comparator means; and
means for supplying synchronization grant signals on a corresponding synchronization signal line to corresponding processors.

* * * * *